Dec. 2, 1958 H. L. MARKY 2,862,865
ELECTRICAL GLOW DISCHARGE OZONIZER
Filed May 9, 1955

HERBERT LEO MARKY - INVENTOR.

BY Richards & Geier
ATTORNEYS

United States Patent Office 2,862,865
Patented Dec. 2, 1958

2,862,865

ELECTRICAL GLOW DISCHARGE OZONIZER

Herbert Leo Marky, Zurich, Switzerland, assignor to Kerag Kesselschmiede, Apparate- und Maschinenbau, Richterswil, Switzerland, a company of Switzerland Application May 9, 1955, Serial No. 507,045

Claims priority, application Switzerland May 8, 1954

7 Claims. (Cl. 204—318)

The present invention relates to an electrical glow discharge ozonizer.

Ozonizers in which a glow discharge acts on a current of air are known in various designs. As a rule, the electrodes are of tubular configuration while the glow discharge is usually caused to take place in a glass tube in which is arranged a thin rod-type electrode which is under a sufficiently high voltage in respect of a water-filled container into which the tube projects. A current of air passed through the tube is then ozonized by the action of the glow discharge. Prior art apparatus for the production of ozone of the described type has, however, an important disadvantage. As is well known, devices for the production of ozone can operate with a high degree of efficiency only when very dry air is utilized. Therefore all ononizers are provided with devices for drying air. When a glass tube breaks in an apparatus of this type, the water surrounding the tubes comes directly in contact with the air to be treated. In this manner the air absorbs water, so that air flowing into the remaining tubes has a certain water content. This, however, causes the efficiency of an aggregate consisting of many units to decrease very rapidly. Since, as is well known, glass breakage practically cannot be avoided, one had to watch over the apparatus continuously so that the broken glass would be immediately discovered and the damaged tubes exchanged.

An object of this invention is to eliminate these drawbacks.

According to the present invention the bottom of a glass tube is provided with a vessel containing a liquid which is lighter than water and which will not be absorbed by air so that in the case of glass breakage, this fluid floats on the surface of the water and thus locks the dry air from the water.

Figure 1:
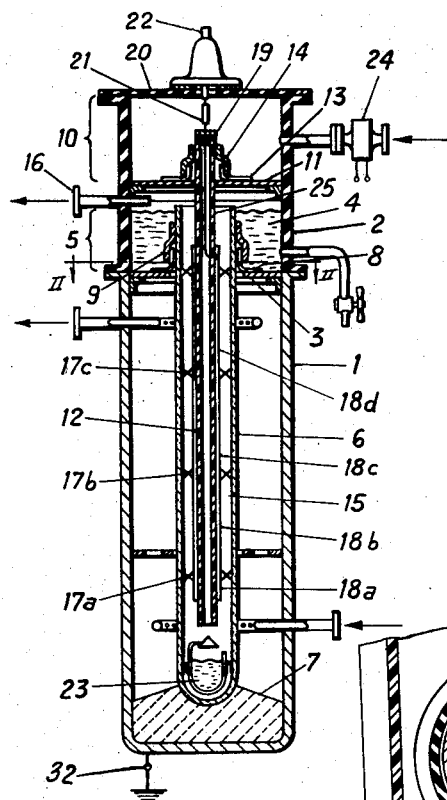
Figure 2:
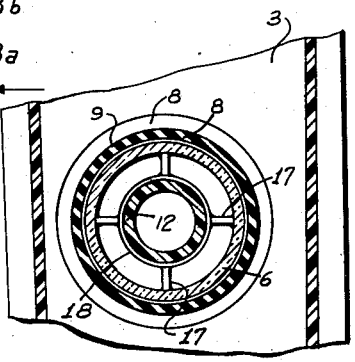

An embodiment of this invention is described in connection with Figs. 1 and 2, of which Fig. 1 shows a longitudinal section of an ozonizer tube, Fig. 2 is a section along the line II—II of Fig. 1.

Figure 3:
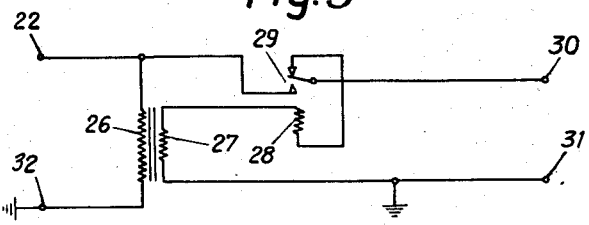

Fig. 3 shows an embodiment of the electrical supply.

A container is provided which comprises a water-filled lower metal portion 1 and a top portion 2 formed of an insulating material. The top portion 2 comprises an ozone chamber 5 partly filled with a liquid 4 and closed against the lower portion 1 by means of wall 3. A glass tube 6 projects into the water-filled container portion 1 through the separating wall 3 and its bottom rests on a resilient and corrosion resistant base 7. The upper end of the tube 6 projects into the ozone chamber 5 above the liquid 4. A sleeve 8 guides the tube 6 in the chamber 5; the tube 6 is sealed against the lower container portion 1 and its water content by means of a length of hose 9 slipped over it.

Arranged above the ozone chamber 5 is the fresh-air chamber 10 sealed against the ozone chamber 5 by a separating wall 11. From the said fresh-air chamber 10 a tubular inner electrode 12 projects through the wall 11, in which it is guided by a sleeve 13 and sealed by means of an ozone resistant length of hose 14 slipped over it, into the chamber 5 and into the glass tube 6. This hollow electrode is designed to supply the fresh air flowing into chamber 10 through connection whence the air flows in an upward direction through the glow discharge chamber 15. It is ozonized in the said chamber 15, flows into ozone chamber 5 and is discharged through the ozone nipple 16. Furthermore a plurality of spacers 17a, 17b and 17c can be provided, as shown in Figure 1, so that everywhere exactly the same distance between the inner electrode 12 and the inner wall of the glass tube 6 is assured.

The hollow inner electrode 12 here comprises an insulating tube 25 on which are arranged several electrically interconnecting metal sleeves 18a, 18b etc. which extend at least over the portion of the electrode 12 arranged in the water filled container portion 1.

The metal sleeves 18 are connected to a resilient contact 19 in the upper end by means of a lead arranged in the interior of the insulating tube 25. When the container lid 20 is in place, this contact 19 is connected to the high-tension connection 22 via an overload fuse 21. The metal sleeves are preferably formed of an ozone and corrosion resistant steel alloy. However, the portion of the interior electrode 12 projecting into the container portion 1 may, if desired, be formed of a single metal tube formed, and attached to a length of insulating tube projecting upwards into the chamber 10.

Arranged in the bottom of the glass tube 6 is an oil-filled container 23. If the glass tube 6 is damaged and water enters the interior of the said tube, the oil will rise to the surface of the inner water column and cause its surface to be sealed against the ozone chamber 5.

Fresh air is supplied to chamber 10 through an automatically controlled valve 24.

During the operation, pre-dried air flows into the air chamber 10 and then downwardly through the electrode 12.

Thereupon the air flows upwardly between the outer wall of the electrode 12 and the inner wall of the glass tubes. In this space there is a strong electrical field, so that due to the discharge which is present here, ozone will be produced. The ozone reaches the ozone chamber 5 from where it flows into the ozone conduit 16. In the ozone chamber 5 there is the fluid 4 which protects the connecting hose 9 from corrosion by ozone.

The design here described is particularly inexpensive and simplifies maintenance and replacement of individual parts when damaged.

The container 1, 2 is usually grounded via connection 32 and with the water in the lower portion 1 forms the counter-electrode for the high-tension electrode here formed by the metal sleeves 18. As seen in Fig. 3, the high voltage required for operation is supplied to the electrodes via the connections 22 and 32 respectively from the secondary winding 26 of a suitable high-tension transformer. The primary winding 27 of the said transformer is supplied with alternating current via an overload responsive member here shown as a relay with an energizing winding 28 and the contacts 29 from the mains connected at 30, 31.

In normal operation the contact 29 is in the idle position shown. In the event of a short-circuit, e. g. by the entrance of water into the glow discharge chamber 15, between the high-tension electrode 18 and the wall of the container, and of the high-tension circuit not being immediately interrupted by the fuse 21, the current rise in the primary circuit causes the overload relay 28, 29 to respond. The contact 29 is switched, interrupts current supply to the primary winding 27 and connects the mains 30 to the high-tension connection 22. If the mains 31 is grounded as usual, the mains voltage of the connections 30, 31 is connected to the high-tension connection 22 as a strong low-tension source and creates such a short-circuit current between the two electrodes that the fuse 21 is sure to melt. A short impulse is sufficient for the defective ozonizer to be disconnected from the secondary winding 26 when the contact 29 of the now de-energized relay 28, 29 drops into idle position thereby replacing the transformer in circuit.

This arrangement is particularly recommended when a large number of such ozonizers have their high-tension connections 22 connected in parallel and are connected to the same high-tension transformer 26, 27. In the event of a short-circuit occurring in one of these ozonizers, the unit is disconnected from the secondary circuit by its fuse 21 in the manner described above, operation of all the other ozonizers being interrupted during a very short period only.

The circuit shown in Fig. 3 is only an embodiment for mains with grounded conduits. The contact 29 can obviously shut off any other suitable strong low-tension source after disconnection of the transformer energization to the electrode connections 22, 32. By way of example a small auxiliary transformer having a low plate resistance and low secondary tension may be employed.

Having now particularly described and ascertained the nature of my said invention and in what manner the same is to be performed, I declare that what I claim is:

1. An electrical glow discharge working unit for the production of ozone comprising at least one vertically arranged glass tube having a closed bottom, an inner hollow electrode member located in said glass tube and spaced from the inner walls of said tube, a container enclosing said glass tube, means forming an ozone chamber on top of said glass tube and a fresh air supply chamber on top of said ozone chamber, said ozone chamber communicating with the space between the said glass tube and said inner electrode member, sealing means sealing said ozone chamber against said air chamber, said inner electrode member having an upper end projecting through said ozone chamber to conduct fresh air from said air chamber to the bottom of said tube, and a separate open-topped container located at the bottom of said tube and below the bottom end of said inner electrode member, the last-mentioned container being adapted to be filled with a small quantity of oil, whereby said oil will rise to top of said glass tube and said inner electrode in the event of water entering said glass tube to form a separating zone against the ozone atmosphere.

2. An electrical glow discharge working unit for the production of ozone in accordance with claim 1 wherein the inner electrode member comprises a tube of plastic material and at least one metal sleeve connected with said plastic material.

3. An electrical glow discharge working unit for the production of ozone in accordance with claim 1 wherein the first-mentioned container is metallic, said unit comprising two leads of a source of electrical energy and an overload fuse in the fresh air chamber, the inner electrode member being connected to one lead by said overload fuse while the other lead is connected to the first-mentioned metallic container.

4. An electrical glow discharge working unit for the production of ozone in accordance with claim 1 wherein a separating wall formed of insulating material is provided between the fresh-air chamber and said underlying ozone chamber through which wall said inner electrode member passes, a tubular sleeve held at the surface of said wall, and a length of hose slipped over said sleeve and said inner electrode whereby a seal between said chambers is formed.

5. An electrical glow discharge working unit for the production of ozone in accordance with claim 1 wherein a separating wall is provided between said ozone chamber and the first-mentioned container through which wall said glass tube projects, a sleeve upon a surface of said wall and guiding said tube, and a length of hose slipped over said sleeve and said glass tube to form a seal, the portion of the ozone chamber containing said hose being adapted to be filled with oil to protect said hose against damage by the ozone.

6. A device in accordance with claim 1, comprising an automatically controlled valve and a plurality of electrical glow discharge working units for production of ozone, wherein each unit occupies a similar fresh air chamber whereby the fresh air supply to each single fresh air chamber is effected over said automatic controlled valve.

7. An electrical glow discharge working unit for the production of ozone in accordance with claim 1 comprising a transformer having a primary circuit containing an overload responsive member and a controlled switching device actuated by said overload responsive member and designed to interrupt the transformer energization temporarily, and a secondary circuit containing a strong voltage source and connected with the inner electrode member and the first-mentioned container, said strong voltage source being connected with said switching device and being adapted to be included in the circuit by said switching device.

References Cited in the file of this patent

UNITED STATES PATENTS

| 986,194 | Meeker et al. | Mar. 7, 1911 |
| 987,902 | Meeker | Mar. 28, 1911 |
| 1,130,827 | Knox | Mar. 9, 1915 |

FOREIGN PATENTS

| 259,434 | Germany | May 3, 1913 |